(12) United States Patent
Richburg

(10) Patent No.: US 7,771,256 B1
(45) Date of Patent: Aug. 10, 2010

(54) IN-FEED CAN

(76) Inventor: James B. Richburg, 101 Pumpkin La., Sumter, SC (US) 29150

( * ) Notice: Subject to any disclaimer, the term of this patent is extended or adjusted under 35 U.S.C. 154(b) by 182 days.

(21) Appl. No.: 12/221,653

(22) Filed: Aug. 5, 2008

(51) Int. Cl.
  *A22C 17/00* (2006.01)
  *B02C 19/22* (2006.01)
(52) U.S. Cl. .......................... 452/138; 241/74
(58) Field of Classification Search ................. 452/138; 241/24, 74, 82.3, 89.5
  See application file for complete search history.

(56) References Cited

U.S. PATENT DOCUMENTS

| | | | |
|---|---|---|---|
| 2,910,726 A | 11/1959 | Parshall et al | |
| 3,734,148 A | 5/1973 | McCulty | |
| 4,025,001 A | 5/1977 | Yarem et al. | |
| RE31,631 E | 7/1984 | McFarland | |
| 4,824,027 A * | 4/1989 | Shaw et al. | 241/24.16 |
| 5,160,290 A * | 11/1992 | Richburg | 452/135 |
| 5,306,202 A * | 4/1994 | Meeker | 452/138 |
| RE35,326 E * | 9/1996 | Richburg | 452/135 |
| 5,580,305 A * | 12/1996 | McFarland | 452/138 |
| 5,628,466 A | 5/1997 | Haack et al. | |
| 5,749,776 A * | 5/1998 | Evans | 452/138 |

* cited by examiner

*Primary Examiner*—Thomas Price
(74) *Attorney, Agent, or Firm*—McNair Law Firm; Cort Flint

(57) ABSTRACT

A feed section of a de-boning apparatus connected with an output section. The feed section comprises a cylinder forming a loading section and a packing section. The portion forming the loading cylinder section has a larger radius than the cylinder portion forming the packing section. A tapered face interconnects the cylinder portion forming the packing section. An auger having a helical flight of a constant radius passes through the cylinder forming a void along its length between the cylinder portion having a larger radius and the helical flight. The void allows product fed into the feed section to completely surround the auger and fill the helical void within the loading section with reduced pressure against the product.

11 Claims, 3 Drawing Sheets

IN-FEED CAN

BACKGROUND OF THE INVENTION

This invention relates to improvements in meat or product separating or de-boning machines of the type where a rotating screw or auger rotates within a cylinder to convey the meat or product through a cylinder from a feed portion into a product portion where the exterior wall of the cylinder comprises a screen. Here the meat or product content is separated from the bone by being passed through the openings while the bone and other waste is passed into discard area. Machines of this type are well known, and all function in generally the same manner. Typical prior United States patents directed to meat or product separating machines are represented by U.S. Pat. No. 4,824,027 to Shaw et al., U.S. Pat. No. 5,160,290 to Richburg, and U.S. Pat. No. 5,749,776 to Evans. Typically, these patents are directed to structural improvements which are intended to decrease pressure on the product, enhance efficiency in the de-boning operation and increased productivity. These results are generally attempted to be achieved by varying the outer diameter of the helical flight of the auger from inlet to outlet ends. Another attempt is to vary the diameter of the auger flight, thus providing a helical void of varying depth. To date, none of these alterations have achieved the desired results to the degree wanted.

The instant invention has as an object a de-boning machine which operates with increased output.

Another object is a de-boning machine which operates at reduced pressure on the product.

Another object of the invention is the provision of two diameter cylinders.

Another object of the invention is the provision of a cylinder in which inner walls are parallel.

Another object of the de-boning machine is to operate without substantially heating the product during the process.

Another object is the provision of an enlarged loading or feed chamber which allows the helical void within the chamber to be completely filled.

Another object is reduced refrigeration costs due to reduced material heat.

SUMMARY OF THE INVENTION

The invention is directed to a de-boning apparatus having an improved feed can which operates to supply product to the product section with reduced energy at reduced cavitation and at a higher rate.

The feed can includes a feed sleeve. The feed cylinder comprises a first chamber formed of spaced first inner walls of a first radius and a second chamber formed of a second inner wall of a larger second radius. The second inner wall is located between the first inner walls and is connected with the feed sleeve and the second chamber. The inner walls are parallel along their length.

The product section includes an output opening, an output cylinder having an inner wall of a first radius equal the first radius of the feed cylinder. The inner wall includes openings about its radius through which the product passes.

An auger, which includes along its length, a helical flight, forming a helical void, passes through the feed can and the product section. The auger is of a constant outside diameter.

The product is moved through the feed sleeve under pressure into the feed can to completely fill the second chamber and the helical void along the auger within the second chamber. As the product is moved toward the product section, one of the first inner walls acts to further compress the product within the helical void as the product is passed there beneath. The excess product in the second chamber acts to provide a reserve, which along with newly fed product, easily and quickly refills the void along the auger. The increased clearance between the auger and the edge of the feed sleeve reduces shearing motion and cavitation which results in reduced power requirements and reduced product heating.

The first inner wall is connected with the second inner wall by tapered face which extends along an angle of approximately 45%. The tapered face acts to guide and compress the product during movement through the cylinder.

An edge is formed along the connection between the tapered face and the first inner wall. This edge acts to further cut and condition the product during movement from the first chamber into the second chamber.

The radius of the inner wall of the second chamber is about ½" greater than the radius of the inner wall of the first chamber. The tapered surface is about ¾" in length.

The auger is driven between 400 and 1800 RPM's. An electric motor of as little as 40 hp may be used to operate the de-boning machine.

The space between the outer edge of the helical flight of the auger remains filled with product which completely surrounds the auger within the second chamber. This product moves easily into the voids as they become cleared allowing the auger to be completely filled with product at all times.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
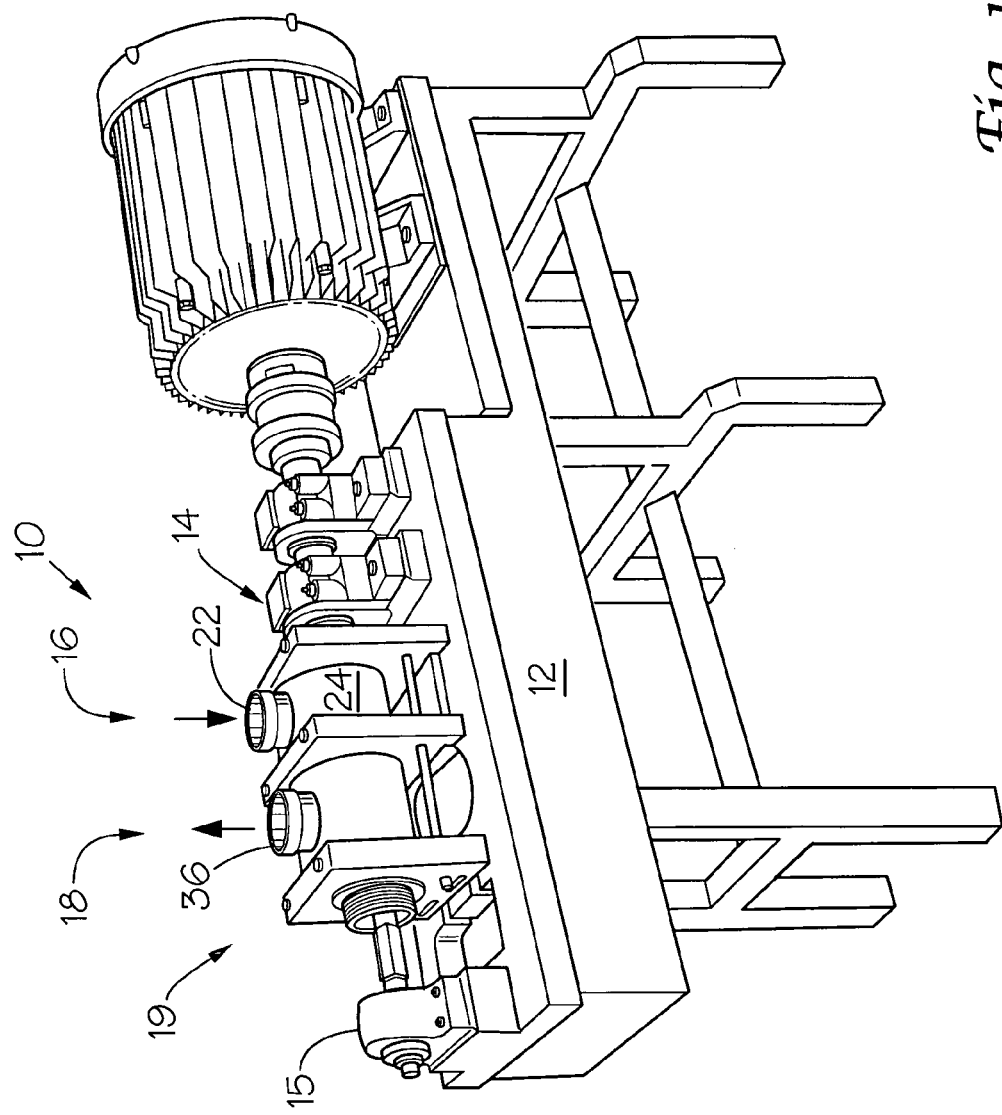
FIG. 1 is a perspective view of the de-boning machine of the invention.
Figure 2:
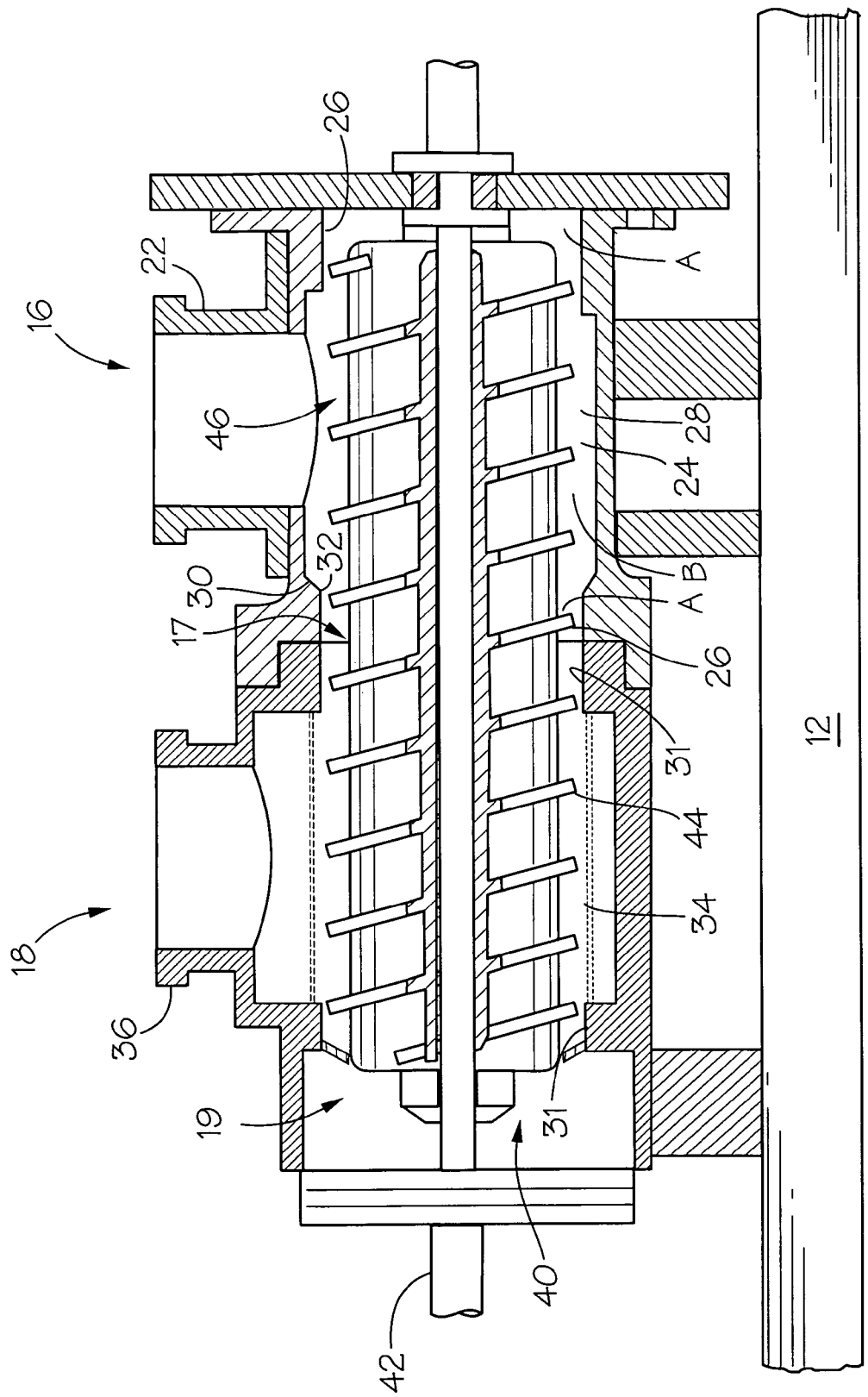
FIG. 2 is a sectional cutaway side view of the de-boning machine of FIG. 1.
Figure 3:
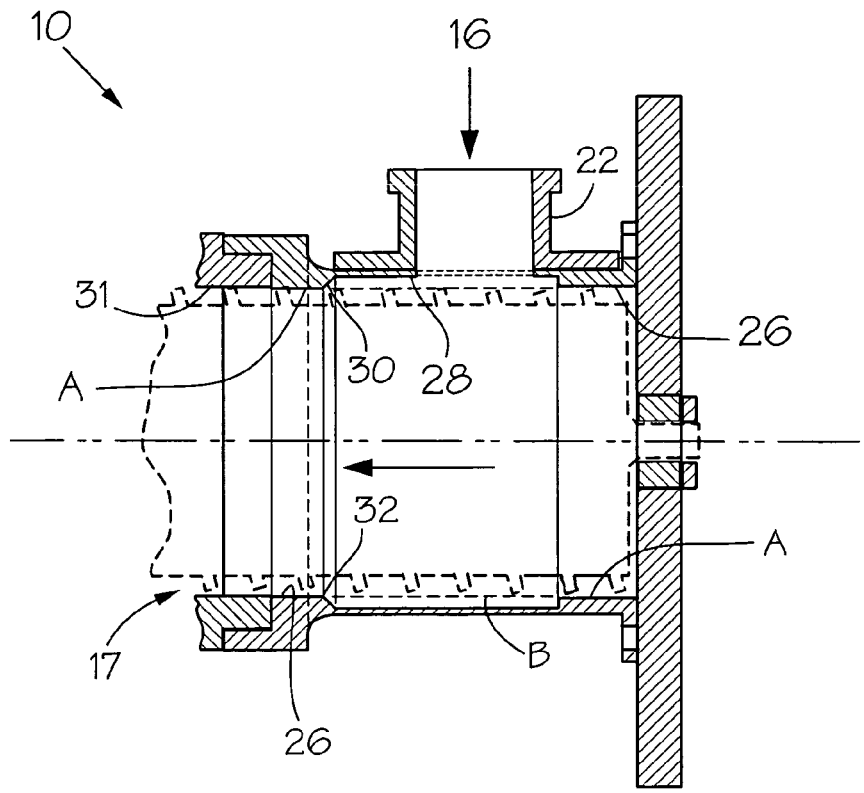
FIG. 3 is a cutaway side view of the feed can with the auger shown in dash lines; and, FIG. 4 is a cutaway side view of the feed can and auger receiving product.
Figure 4:
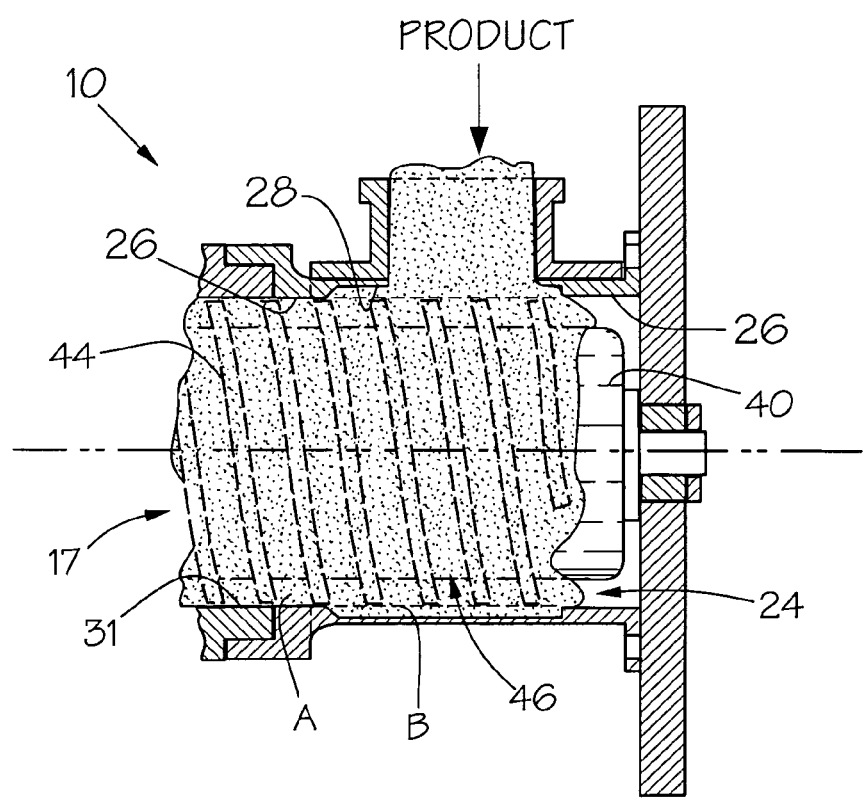

Turning now to the drawings, the de-boning machine 10 of the invention can best be seen in FIGS. 1 and 2.

The machine rests on a support frame 12 and includes drive motor with a drive shaft carried by bearings 14, 15. A feed can 16 is provided adjacent the motor and bearings 14 and is connected by way of cylinder 17 with a grinding or product section 18. Bone exit or discharge end 19 is located at the downstream end product section 18 of the de-boning machine.

The feed can 16 includes feed sleeve 22 which connects with that portion of cylinder 17 which constitutes feed cylinder 24. Feed cylinder 24 comprises first and second chambers A & B which are formed with inner walls of different radiuses. Inner wall 26, forming first chamber A, is formed with a radius which is less than the radius of the inner wall 28 forming second chamber B. The radius of wall 28 is between 0.02" to 0.6" greater than the radius of inner wall 26. A tapered face 30 interconnects walls 26 and 28 and forms edge 32.

It is noted that the opening through feed sleeve 22 opens into a void area of the second chamber B which is laterally spaced between walls 26 and between the outer circumference of the auger and wall 28.

Product section 18 continues the cylinder 17 from feed can 16 with inner walls 31 separated by perforated wall or screen 34. Walls 31, 34 form the output section of cylinder 17 of equal radius with that of first chamber A of the feed cylinder 24.

The product is delivered from the feed can into the product section of cylinder 17 where it is passed through perforated section 34 of wall 31 and out product sleeve 36. Bone and other residue passes out discharge end 19.

The structure of the discharge end and product chamber is known structure and forms no part of the instant invention with the exception of radius of cylinder 17.

Auger 40 is connected with shaft 42 driven by the electric motor. Auger 40 is preferably formed with vane 44 extending outwardly along a spiral path. The vane may extend substantially vertically or it may be slanted in a downstream direction. The vane forms a spiral void 46 along the length of the auger. The auger and vane are preferably formed with a uniform outside diameter.

In operation, with the auger rotating at a constant speed of between 400 and 1800 RPM's, product is fed through feed sleeve 22 into second chamber B of cylinder 17. The product passes around auger 40 filling spiral void 46 and the reserve area or void formed by chamber B. As the product passes from chamber B into chamber A, that portion of the product above vane 44 in the void of chamber B, is contacted by tapered face 30 and edge 32, where it is further compacted and further cut as it is pushed into chamber A and onto perforated wall 34 section of cylinder 17 within product section 18.

Because of reserve area or void formed by chamber B, there is reduced pressure required to feed and maintain product flow into the loading chamber of feed can 16. The product completely surrounds the auger filling the spiral void completely around the auger. Normally, only about 25% of the auger outside surface area is covered with product due to the limited area between the auger and cylinder. In the instant structure, 100% of the auger outside surface is covered. Because the reserve area allows for less pressure to push the product into feed cylinder 24, there is less power required to drive the auger which results in less heat build-up in the product.

Because of the tapered surface 30, which surrounds the auger, the product is guided along an incline while being packed into the spiral void when leaving chamber B and moving into chamber A. This guiding and packing action occurs completely about the auger requiring reduced pressure and producing less heat in the product. It is noted that the back side of chamber B may comprise a vertical wall as shown.

While a preferred embodiment of the invention has been described using specific terms, such description is for illustrative purposes only, and it is to be understood that changes and variations may be made without departing from the spirit or scope of the following claims.

What is claimed is:

1. An improved de-boning apparatus including a feed can, a product section and a waste section interconnected with a cylinder:
    said feed can, having a feed sleeve and a feed cylinder, said feed cylinder having a first chamber formed of spaced first inner walls of a first radius and a second chamber formed of a second inner wall of a second larger radius located between said first inner walls, said feed sleeve connecting with said feed cylinder through said second inner wall of said second chamber and between said spaced first inner walls of said first chamber;
    said product section having an output sleeve and an output section of said cylinder having an inner wall including a screen of said first radius, said screen having openings there through about its radius through which said product is passed;
    an auger of substantially constant diameter having a helical flight forming a helical void passing through said feed can and said product section; wherein,
    product passed through said feed sleeve into said second chamber of said feed can completely fills a void between said auger and said second wall of said second chamber and said helical void along said auger within said second chamber without shearing, said material within said helical void is then moved past one of said first inner walls which acts to separate said product within said void from said product within said helical void allowing said product within said helical void to move from said feed can into said product section where said product passes out through said openings.

2. The de-boning apparatus of claim 1 wherein said first inner wall is connected with said second inner wall by a tapered face which extends along an angle of approximately 45%, said tapered face acting to separate said product within said void from said auger during movement into said first chamber while exerting minimum pressure on said product.

3. The de-boning apparatus of claim 2 including an edge formed between said tapered face and said first inner wall, said edge acting to cut and separate said product during movement from said second chamber into said first chamber and said product section.

4. The de-boning apparatus of claim 1 wherein said cylinder forming said feed cylinder and said output section cylinder are individual units interconnected.

5. The de-boning apparatus of claim 1 wherein the radius of said second inner wall is about ½" greater than the radius of said first inner wall.

6. The de-boning apparatus of claim 1 wherein said taper is about ¾" in length between said first and second surface.

7. The apparatus of claim 1 wherein said space, which remains filled with product and under reduced pressure during operation, causes said helical void of said auger to more quickly fill with product.

8. A de-boning apparatus comprising:
    a feed section interconnected with an output section;
    said feed section comprises a loading section and a packing section forming a cylinder which passes through each section, said cylinder portion passing through said loading section having a larger radius than the radius of said cylinder portion passing through said packing section;
    a tapered face interconnects said larger radius and smaller radius cylinder portions of said feed and packing sections;
    said output section includes a cylinder of a radius equal that of said packing section cylinder portion, said output cylinder having a perforated inner wall;
    an auger having a helical flight of constant radius forming a helical void along its length positioned to extend through said feed and output sections; wherein,
    in operation with said auger rotating, product is fed into said loading section to completely surround said auger and fill said helical void within said loading section, said product is moved toward said output section against said tapered surface and into said cylinder of said packing section where it is compressed in said helical void;
    said product is then moved into said output section where it passes through said perforated wall as finished product.

9. The apparatus of claim 8 wherein said auger is driven at between 400 and 1800 RPM's.

10. The apparatus of claim 8 wherein said auger is driven by a motor having as little as 40 hp.

11. The apparatus of claim 8 wherein inner walls of said cylinder are parallel.

* * * * *